(12) United States Patent
Hollingsworth

(10) Patent No.: US 6,177,868 B1
(45) Date of Patent: Jan. 23, 2001

(54) RETRACTABLE CARGO HEIGHT SENSING SYSTEM

(76) Inventor: Daniel R. Hollingsworth, 46785 Middle Ridge Rd., Amherst, OH (US) 44001

(*) Notice: Under 35 U.S.C. 154(b), the term of this patent shall be extended for 0 days.

(21) Appl. No.: 09/594,982

(22) Filed: Jun. 15, 2000

(51) Int. Cl.⁷ .................................................. G08B 21/00
(52) U.S. Cl. .......................... 340/540; 304/555; 304/556; 304/904; 180/41; 180/271
(58) Field of Search ................... 340/540, 904, 340/555, 556, 557, 686.1, 686.2, 673, 685; 1/436; 180/41, 271, 290

(56) References Cited

U.S. PATENT DOCUMENTS

| | | | |
|---|---|---|---|
| 2,834,002 | * 5/1958 | Nordsiek | 340/904 |
| 3,716,833 | * 2/1973 | Roth | 340/904 |
| 4,284,971 | * 8/1981 | Lowry et al. | 340/524 R |
| 4,741,206 | 5/1988 | Ishiquro | 73/118.1 |
| 4,847,591 | 7/1989 | Ota | 340/440 |
| 5,080,541 | 1/1992 | Andre | 410/24.1 |
| 5,276,426 | * 1/1994 | LoBello | 340/436 |
| 5,389,912 | * 2/1995 | Arvin | 340/435 |
| 5,424,713 | * 6/1995 | Thompson et al. | 340/436 |
| 5,527,138 | 6/1996 | Flores | 410/29.1 |
| 5,710,553 | * 1/1998 | Soares | 340/903 |
| 5,828,320 | * 9/1997 | Buck | 340/942 |
| 5,906,648 | 5/1999 | Zoratti | 710/50 |

\* cited by examiner

*Primary Examiner*—Jeffery A. Hofsass
*Assistant Examiner*—Phung Nguyen
(74) *Attorney, Agent, or Firm*—Robert R. Hussey, Co. LPA

(57) ABSTRACT

A retractable cargo height sensing system is provided for use with a cargo transporting vehicle to sense the height above a roadway of cargo carried by the cargo transporting vehicle. The height sensing system includes an alarm for signaling when the cargo is above a predetermined height above the roadway. The system also includes a plurality of sensors mounted on the cargo transporting vehicle and movable between a lowered position and a raised position. In the raised position, the sensors are positioned to detect when the cargo is above the predetermined height and provide a signal to the alarm to activate the alarm or alternatively send a signal to the alarm to de-activate the alarm when the cargo is below the predetermined height. In a lowered position, the sensors are positioned below the predetermined height to facilitate movement of the cargo transporting vehicle. The retractable cargo height sensing system also includes a cylinder switching system which provides for moving the sensors to the raised position when the vehicle braking system is engaged and the power take off system of the vehicle is engaged. The cylinder switching system also provides for moving the sensors to the lowered position when the braking system of the vehicle is disengaged. A method for sensing the distance above a roadway of cargo on a cargo transporting vehicle is also provided.

14 Claims, 3 Drawing Sheets

RETRACTABLE CARGO HEIGHT SENSING SYSTEM

BACKGROUND OF THE INVENTION

This invention relates in general to a retractable cargo height sensing system for sensing when cargo on a cargo transporting vehicle is above or below a predetermined distance above the roadway and provides an alarm when the cargo is above that distance.

It is well recognized in the field of cargo transporting vehicles that when the cargo being transported is above a predetermined distance above the roadway, the cargo will impact bridges and the like when it is above the predetermined distance. In the example of transporting a number of vehicles, such as cars or vans, cargo transporting vehicles having a tractor and a trailer are known and have a wide variety of configurations and designs. In general, the trailer has a number of vehicle carrying platforms that are movable by hydraulic cylinders. The vehicles are driven onto the platforms and the platforms are then moved by hydraulic cylinders into a nested position so the vehicles are nested into a compact configuration to decrease the height that the vehicles are carried. When the vehicles are in the proper position, pins are inserted in support members adjacent the hydraulic cylinders so that the weight of the vehicle is supported by the support members and fluid pressure need not be applied to the hydraulic cylinders to support the vehicles while they are being transported.

Roadways have various obstructions, such as bridges, that are designed to allow a height clearance of a predetermined distance above the roadway, such as 13 ft, 7 inches or another predetermined distance. Other obstructions include wires passing across the roadway and trees growing along the road with their branches over the road trimmed to a predetermined height. These other obstructions are likewise designed or trimmed to a predetermined height. Accordingly, a cargo transporting vehicle can travel along the roadway so long as the cargo is not higher than the predetermined distance. If the cargo is higher it will hit the bridge, tree, or wires or other obstruction causing damage to both the obstruction and the cargo.

One known approach to check the height of the cargo is to measure, with a stick, the height of cargo after it is believed to be at the correct height with the vehicles properly nested. If it is observed that the cargo is above the predetermined distance, it must be a readjusted so that it is below. This approach is cumbersome and inaccurate since generally the predetermined distances are in the order of magnitude of 13 to 14 feet and the driver has difficulty in checking height of the cargo.

Another known system works on the principal of lack of pressure in the hydraulic system that moves the hydraulic cylinders to move the platforms on the trailer. In this system, pressure is sensed in the hydraulic cylinders and anytime there is a buildup of hydraulic pressure in the system, the driver will receiving alarm alerting the driver that a vehicle platform or deck is up. The problem with this system is that drivers set the vehicle platform or attach the post pins while loading and unloading and accordingly sensing hydraulic pressure in the hydraulic cylinders does not assure that the cargo is within the predetermined height from the roadway.

It is desirable to provide a cargo height sensing system for sensing whether cargo on a cargo transporting vehicle is below a predetermined distance above the road. Such a system allows the driver of the cargo transporting vehicle assurance that the cargo can pass under obstructions above that height. It is also desirable that such a system provide an alarm which is activated when the cargo is above the predetermined distance so that the driver can lower the cargo before commencing his journey and deactivated when the cargo is below the predetermined height.

Another desirable feature of a cargo height sensing system is that the sensors detecting the height of the cargo are retractable from a raised position, which may be above the predetermined distance, to a lowered position below the predetermined distance or height. This retractable feature avoids damage to the sensors from impacting its obstructions in the roadway during movement of the cargo transporting vehicle.

It is another desirable feature of a cargo height sensing system to move the sensors from the lower position to the raised position when a power takeoff unit (PTO) of the cargo transporting vehicle is activated and its brake system is activated. The first requirement, that a power takeoff unit may be engaged, provides that pressurized fluid is provided to the hydraulic cylinders to raise a lower the cargo carrying platforms or deck. By also requiring that the brakes on the cargo transporting vehicle be activated before raising the sensors, any movement of the cargo carrying vehicle is impeded when raising the sensors. Such a system allows for raising the sensors only when the proper conditions exist and vehicles may be loaded onto the cargo transporting vehicle.

After vehicles are mounted on a cargo transporting vehicle is desirable to lower the sensors for moving the cargo transporting vehicle. Accordingly, is desirable to lower the sensors when the brake system is released and the power takeoff unit is disengage. In this condition, the hydraulic cylinders which raise and lower the cargo do not have pressurized hydraulic fluid supplied them and cannot move the cargo and when releasing the brake system the vehicle is free to move.

SUMMARY OF THE PRESENT INVENTION

The present invention provides the above described desirable features with an improved cargo height sensing system. The cargo height sensing system of the present invention is provided for use on a cargo carrying vehicle, such as a tractor and trailer for transporting vehicles such as vans, cars, trucks, boats and other cargo for sensing whether cargo on a cargo transporting vehicle is below a predetermined distance above the road. Such a system allows the driver of the cargo transporting vehicle assurance that the cargo can pass under obstructions above that height.

The retractable cargo height sensing system of the present invention includes an alarm for signaling when the cargo is above a predetermined height above the roadway. The alarm is activated when the cargo is above the predetermined distance so that the driver can lower the cargo before commencing his journey and deactivated when the cargo is below the predetermined height.

The retractable cargo height sensing system of the present invention also includes a plurality of sensors mounted on the cargo transporting vehicle and movable between a lowered position and a raised position. In the raised position, the sensors are positioned to detect when the cargo is above the predetermined height and provide a signal to the alarm to activate the alarm or alternatively send a signal to the alarm to de-activate the alarm when the cargo is below the predetermined height. In a lowered position, the sensors are position below the predetermined height to facilitate movement of the cargo transporting vehicle and avoid damage to the sensors from impacting obstructions in the roadway during movement of the cargo transporting vehicle.

The retractable cargo height sensing system of the present invention also includes a cylinder switching system which provides for moving the sensors to the raised position when the vehicle braking system is engaged and the power take off system of the vehicle is engaged. The cylinder switching system also provides for moving the sensors to the lowered position when the braking system and the power take off system of the vehicle is disengaged. A method for sensing the distance above a roadway of cargo or a cargo transporting vehicle is also provided.

Other desirable features and advantages of the present invention will become apparent from a study of the following description and accompanying drawings which are illustrative of the invention.

DETAILED DESCRIPTION OF THE INVENTION

Figures 1, 2:
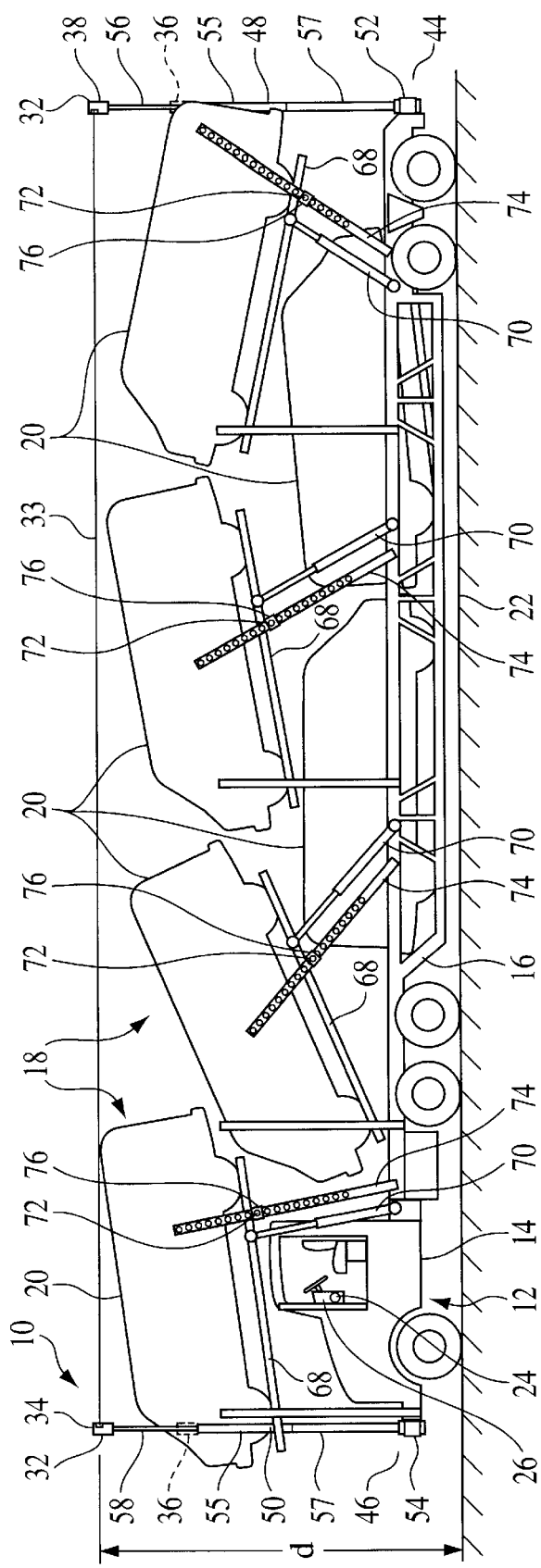
FIG. 1 is a side view of a cargo transporting vehicle with the retractable cargo height sensing system mounted thereon with the cargo below a predetermined height of the roadway.
FIG. 2 is a top view of the cargo transporting vehicle shown in FIG. 1.

The present invention provides a retractable cargo height sensing system 10 for use on a cargo carrying vehicle 12, such as a tractor 14 and trailer 16, for transporting cargo 18, such as the vans 20 on a road 22, shown in FIG. 1. The cargo carrying vehicle 12 may be of any construction known to those in the art of transporting cargo. It should be understood that the cargo carrying vehicle 12, shown in FIG. 1, is representative of one type of such vehicle. It is within the contemplation of this invention to use the retractable cargo height sensing system 10 of the present invention in a wide variety of cargo carrying vehicles. Such vehicles are capable of carrying a wide variety of cargos, such as cars, trucks, boats and other cargo.

The cargo height sensing system 10 of the present invention provides for sensing whether the cargo 18 on a cargo transporting vehicle 12 is below a predetermined distance "d" above the road. Roadways 22 have various obstructions such as bridges that are designed to allow a height clearance of a predetermined distance "d" above the roadway, such as 13 ft, 7 inches or another predetermined distance. Other obstructions include wires passing across the roadway and trees growing along the road with their branches over the road. These other obstructions are likewise designed or trimmed to a predetermined height. Accordingly, a cargo transporting vehicle can travel along the roadway so long as the cargo 18 is not higher than the predetermined distance "d".

If the cargo 18 is higher, it will hit the bridge, tree, or wires or other obstruction, causing damage to both the obstruction and the cargo 18. Such a system allows the driver of the cargo transporting vehicle 12 to check that the cargo 18 can pass under obstructions above that height "d".

Figure 5:
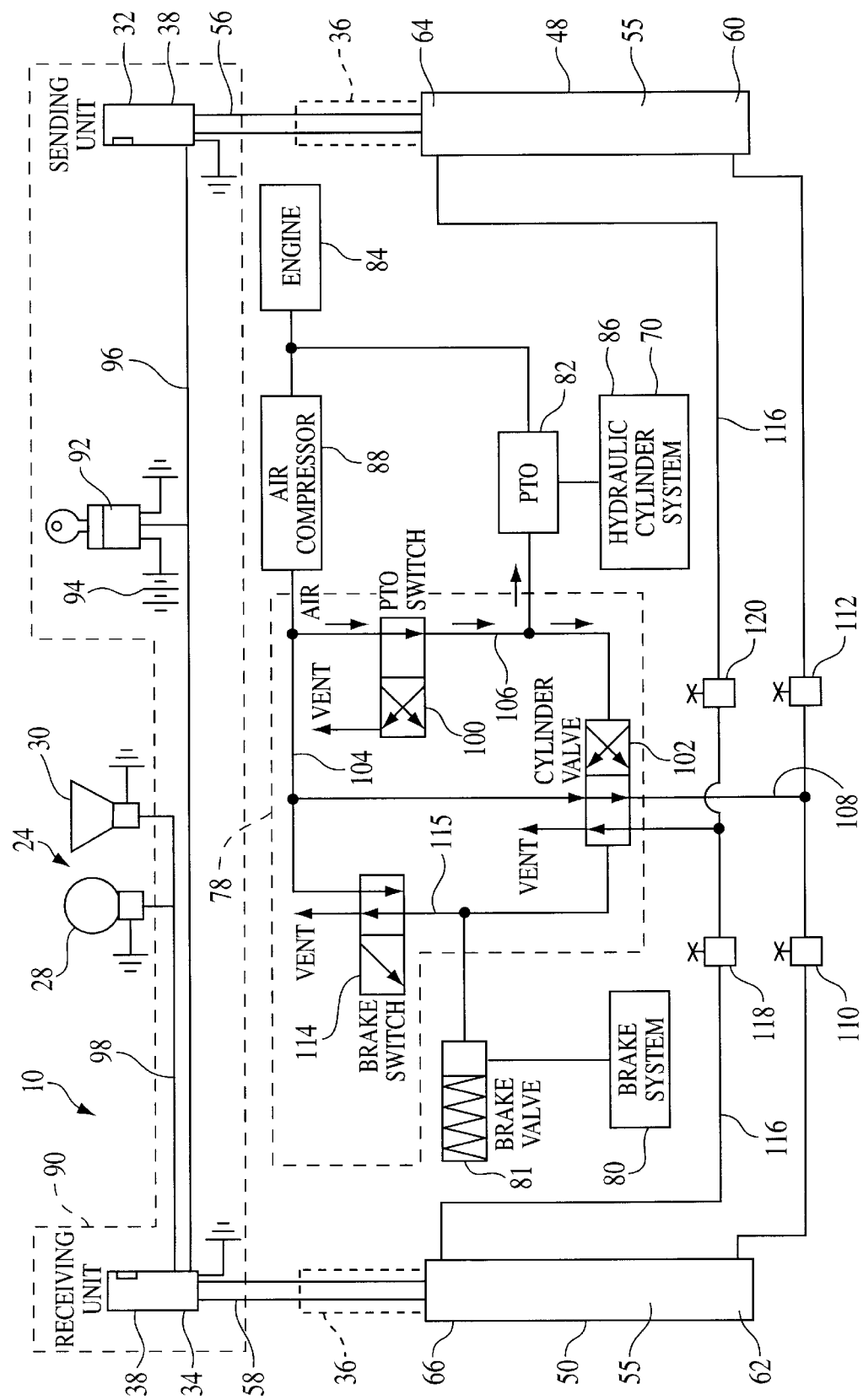
FIG. 5 is a schematic of the retractable cargo height sensing system.

The retractable cargo height sensing system 10 of the present invention includes an alarm 24, shown in FIGS. 1 and 5, which is mounted on the dashboard 26 of the tractor 14 for signaling when the cargo 18 is above a predetermined height "d" above the roadway 22. The alarm 24 includes a visible alarm such as a warning light 28 and an audible alarm such as the buzzer 30. The alarm 24 is activated when the cargo 18 is above the predetermined distance "d" so that the driver is alerted, both audibly and visually, to lower the cargo before commencing his journey. The alarm 24 is deactivated when the cargo 18 is below the predetermined height "d" as will be hereinafter described.

The retractable cargo height sensing system 10 of the present invention also includes sensors 32, 34 mounted on the cargo transporting vehicle 12 and movable between a lowered position 36 and a raised position 38. The sensor 32 is a microwave transmitter that sends a microwave signal, indicated by the line 33, to the sensor 34 which is a microwave receiver. When electrical power is supplied to the sensors 32, 34, the signal 33 is transmitted from the sensor 32 to the sensor 34 and if the sensors 34 detects no signal 33, the alarm 24 is activated. If the sensor 34 does detect a signal 33, the alarm 24 is deactivated. It should be further understood that the sensors 32, 34 may be of a wide variety of sensors that operate to sense whether cargo is between the sensors 32, 34 and may be of any design known to those in the art.

The sensors 32, 34 are mounted on opposite sides 40, 42 of the cargo transporting vehicle 12, as seen in FIGS. 1 and 2. The transmitting sensor 32 is mounted on the passenger side 40 of the rear 44 of the cargo transporting vehicle 12 and the receiving sensor 34 is mounted on the driver's side 42 on the front 46 of the cargo transporting vehicle 12. Since the signal 33 must be able to travel the length and width of the cargo transporting vehicle, cargo above the predetermined distance "d" will be detected. It should be understood that it is also within the contemplation of this invention that the sensors 32, 34 may be mounted on the other opposite sides of the cargo transporting vehicle 12 or in any other position in which they are positioned to sense the height of the cargo 18. Of course, other configurations of the transmitting signal that are adapted to check the height of particular cargo configurations are within the contemplation of this invention.

In order to move the sensors 32, 34 between the raised and the lowered positions, 38, 36, the sensors are mounted on motors 48, 50 which are secured to the rear bumper 52 and the front bumper 54, respectively, of the cargo transporting vehicle 12. The motors 48, 50 may be of any construction that provides for the movement of the sensors 32, 34 between the raised and the lowered positions 38, 36, such as pneumatic cylinders, hydraulic cylinders, or motor-cable systems and as shown in the drawings are pneumatic cylinders 48, 50. Each of the pneumatic cylinders 48, 50 have opposing ends, one of which is a cylinder body 55 and the other of which are the piston rods 56, 58. The cylinder body 55 is secured to an up right 57, which upright member is attached to the rear and front bumper 52, 54, respectively, to position the sensors as described above. The uprights 57 are provided to position the cylinders 48, 50 sufficiently high so the sensors 32, 24 can reach the raised position 38 without excessive travel. Each of the pneumatic cylinders 48, 50 have piston rods 56, 58 respectively which move depended on which direction pressurized air is supplied to the cylinders 48, 50 as is known.

The sensors 32, 34 are mounted to the piston rods 56, 58 so that they may be moved between the lowered and raised positions 36, 38 by selectively supplying pressurized air to one of the opposing ends, bottoms 60, 62 or tops, 64, 66 of the cylinders 48, 50. As seen in FIG. 5, when pressurized air is supplied to the bottom 60, 62 of the cylinders 48, 50 the piston rods 56, 58 move in a vertically upward direction until the sensors 32, 34 are in the raised position 38. When pressurized air is supplied to the top 64, 66 of the cylinders 48, 50, the piston rods 56, 58 move in a vertically downward direction until the sensors 32, 34 are in a lowered position 36. It should be understood that the term pressurized fluid includes any fluid including liquid or gas including air.

In the raised position 38, the sensors 32, 34 are positioned to detect when the cargo 18 is above the predetermined height "d" and provide a signal to the alarm 24 to activate the alarm or alternatively send a signal to the alarm to de-activate the alarm when the cargo is below the predetermined height "d". In a lowered position 36, the sensors 32, 34 are position below the predetermined height to facilitate movement of the cargo transporting vehicle 12 and avoid damage to the sensors from impacting obstructions in the roadway 22 during movement of the cargo transporting vehicle.

As described above, a cargo transporting vehicle 12 for transporting a number of vehicles, such as cars or vans, having a tractor 14 and a trailer 16 are known and have a wide variety of configurations and designs. In general, the trailer 16 has a number of vehicle carrying platforms 68 that are movable by hydraulic cylinders 70 as seen in FIGS. 1–4. The vehicles 20 to be transported are driven onto the platforms 68 and the platforms are then moved by hydraulic cylinders 70 into a compact nested position to decrease the height that the vehicles are carried. When the vehicles 20 are in the proper nested position, pins 72 are inserted in support members 74 pivotally attached to the trailer 16 adjacent the hydraulic cylinders 70 and through collars 76 attached to the platforms 68 which are slideable along the support members. When the pins 72 are so positioned, the weight of the vehicle 20 is supported by the support members 74 and fluid pressure need not be applied to the hydraulic cylinders 70 to support the vehicles while they are being transported. As is known, a wide variety of different constructions have been provided to move the vehicles 20 into a nested position below the predetermined distance "d".

Figure 3:
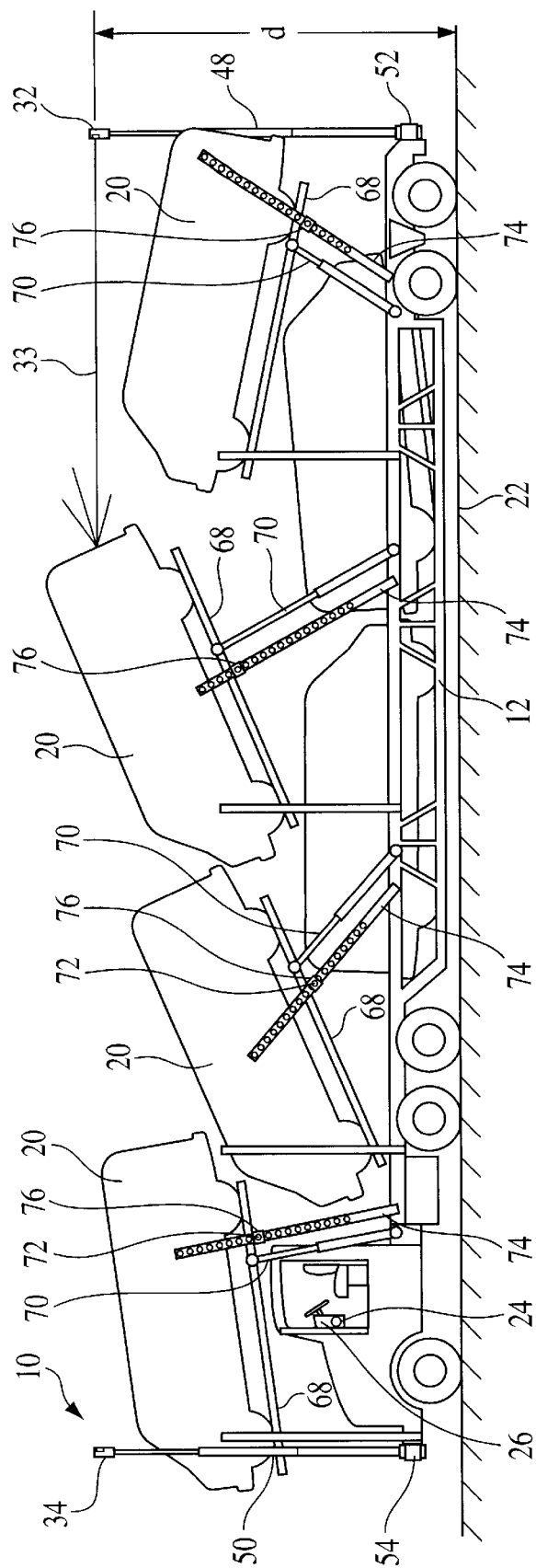
FIG. 3 is a side view of a cargo transporting vehicle with the retractable cargo height sensing system mounted thereon with the cargo above a predetermined height of the roadway.
Figure 4:
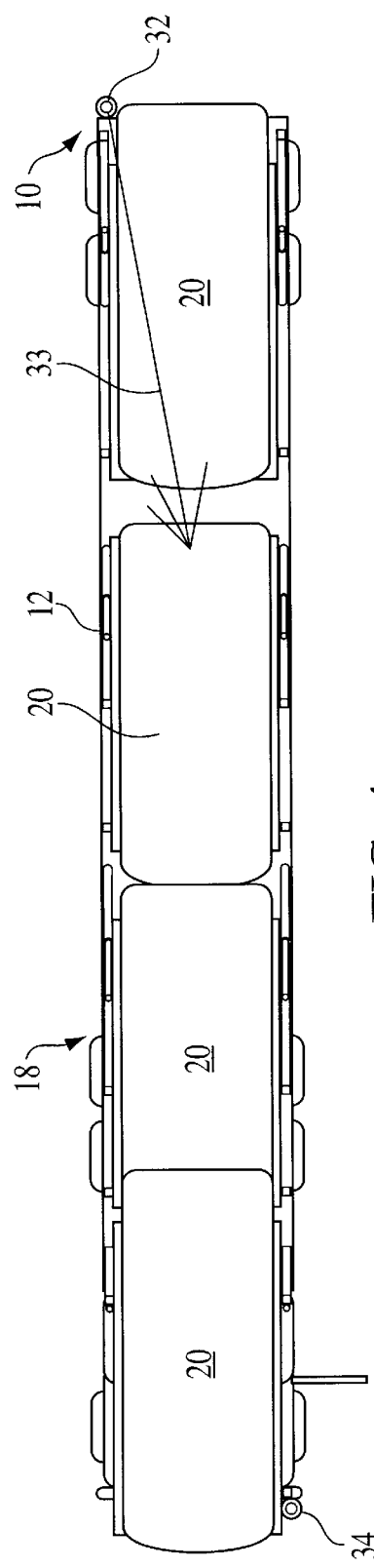
FIG. 4 is a top view of the cargo transporting vehicle shown in FIG. 3.

FIGS. 3 and 4 show a side view of the cargo transporting vehicle 12 with the retractable cargo height sensing system 10 mounted thereon with the cargo 18 above a predetermined height "d" of the roadway 22. This condition would occur for example during loading of the vehicles 20 on the cargo transporting vehicle 12. The transmitter sensor 32 transmits a signal 33 towards the receiving sensor 34 and since the vehicle 20 is above the predetermined distance "d", the signal 33 is interrupted and the receiving sensor 34 consequently does not receive the signal 33. As described herein the alarm 24 is activated which alerts the driver of the cargo transporting vehicle 12 to lower the cargo so that it is below the predetermined distance "d". This is accomplished by activating the hydraulic cylinders 70 supporting the platform 68 which supports the vehicle 20 above the predetermined distance in a downward direction to lower the vehicle so that it is below the predetermined distance.

To secure the vehicle 20 so lowered in that position, a pin 72 is inserted in the support members 74 adjacent the hydraulic cylinder 70 and through the collar 76. In this position, the weight of the vehicle so moved is supported by the support member 74 and pressurized fluid need not be supplied to the hydraulic cylinders 70. When unloading the vehicles 20 from the cargo transporting vehicle 12 the pins are removed. Hydraulic pressure is supplied to the hydraulic cylinders 70 and the platforms 68 may be moved as desired to unload the vehicles 20 from the cargo transporting vehicle.

The retractable cargo height sensing system of the present invention also includes a cylinder switching system 78 which provides for moving the sensors 32, 34 to the raised position 38 when the vehicle braking system 80 is engaged and the power take off system 82 of the vehicle 12 is engaged as seen in FIG. 5. During loading and unloading of the vehicles 20 on the cargo transporting vehicle 12 it is desirable that the braking system 80 be engaged so that the cargo transporting vehicle does not move.

Generally, tractor-trailer vehicles, such as that shown at 12, have a pneumatic braking system 80 that is automatically applied when pressurized air for activating the brakes falls below a predetermined level, such as 70 psi. A Maxi brake valve 81 receives pressurized air from the brake system and when it drops below a certain pressure, the spring pressure in the valve is overcome and the valve 81 actuates the vehicle brake system 80. The present invention provides for disconnecting the valve 81 of the brake system 80 from pressurized air to assure that the vehicle 12 brake system is applied to stop the vehicle 12 from moving.

In addition, when loading and unloading the vehicles 20 from the cargo transporting vehicle 12, hydraulic pressure must be supplied to the hydraulic cylinders 70. Generally tractor-trailer vehicles, such as that shown at 12, have a power take off (PTO) unit 82 selectively connected to the vehicle engine 84, which when engaged generates hydraulic pressure which is directed to the hydraulic cylinder system 86 which includes and operates the hydraulic cylinders 70 to move them in an up or down direction as is known in the art. Known Power Take Off units have a valve which moves the PTO unit 82 into and out of driving engagement with the transmission of the engine 84. The valve is normally in an off position in which the PTO unit 82 is disengaged from the engine 84.

When pressurized air is supplied to the PTO 82, and particularly its valve, the valve actuates a mechanical linkage between the PTO 82 and the transmission of the engine 84. The supply of pressurized air to the PTO unit 82 activates, through a known pneumatic/mechanical device, the PTO unit into engagement with a transmission connected to the engine 84 and generates pressurized hydraulic liquid. When pressurized air supply, such as the air compressor 88, is removed from the PTO valve, the PTO 82 is disengaged from the engine 84 and no longer generates pressurized fluid to the cylinders 70. Accordingly, when loading and unloading vehicles 20 from the cargo transporting vehicle 12 both of these conditions exist. As will be hereinafter more fully described, the cylinder switching system 78 of the present invention provides for both of these conditions when loading vehicles.

When the cargo transporting vehicle 12 is loaded and ready to move, the opposite of these conditions exist, that is the vehicle braking system 80 is disengaged and the power take off system 82 of the vehicle 12 is disengaged. Accordingly, the cylinder switching system 78 also provides for moving the sensors 32, 34 to the lowered position 36 when the braking system 80 and the power take off system 82 of the vehicle 12 are disengaged.

The following is a description of the operation of the retractable height sensing system 10 of the present invention which also provides a description of the method of sensing the height of cargo on a cargo transport.

The sensing circuit 90 is activated by turning a keyed switch 92 to the on position which sends power from a power source 94, such as a battery, thru the circuit 96 to the sending and receiving sensors 32, 34 to activate the sensors, as seen in FIG. 5. When so powered, the sending unit 32 transmits a signal 33 which is received by the receiving unit 34 when the signal is not obstructed and the circuit to the alarm 24 is not activated. The sending and receiving units 32, 34 are mounted on cylinders 48, 50 to raise and lower them as described herein.

When the sending and receiving units 32, 34 are supplied with power and the signal 33 is obstructed, the receiving unit does not receive the signal 33 and provides power thru the circuit 98 to the indicator light 28 and the audible signaling device 30, so that the operator knows that the maximum height is exceeded. When there is no obstruction to the signal between the sending and receiving units 32, 34, the indicator light 28 and audible signal 30 are not activated and the operator knows that the maximum height is not exceeded.

The cylinder switching system 78 is provided to supply pressurized air to the bottoms 60, 62 of the cylinders 48, 50 when the vehicle braking system 80 is engaged and the power take off system 82 of the vehicle 12 is engaged. The cylinder switching system 78 includes a PTO switch 100 and a cylinder valve 102. The PTO switch 100 is connected to the air compressor 88 thru the pneumatic line 104 for selectively providing pressurized air to the PTO unit 82 and the cylinder valve 102 thru the pneumatic line 106. By manually moving the PTO switch 100 to an open position, as shown in FIG. 5, the PTO 82 is connected with the engine 84 and pressurized fluid is supplied to the hydraulic cylinder system 86 as described above. Pressurized air is also supplied thru the pneumatic line 106 to the cylinder valve 102 to position the cylinder valve 102 in a raising position to transmit pressurized air received thru line 104 to the pneumatic line 108 connected to the bottoms 60, 62 of the cylinders 48, 50.

Flow control valves 110, 112 are provided in the pneumatic line 108 to control the speed of movement of the cylinders 48, 50 respectively. As the flow control valve is constricted, less air moves thru the line 108 and the cylinder moves at a slower speed. Conversely, when the flow control valve is opened, more air moves thru the valve and the cylinder moves at a greater speed.

The cylinder switching system 78 also includes a brake switch 114 to disconnect the brake valve 81 from the air compressor 88 and assure engagement of the brakes 80 when the sensors 32, 34 are in the raised position 38. When the brake switch 114 is in the closed position as shown in FIG. 5, air from the air compressor 88 is blocked from flowing thru conduit 115 to the brake valve 81 and the brake system 80 is activated as described above. In the closed position, the brake switch 114 also connects the tops 64, 66 of the cylinders 48, 50 to the atmosphere thru the conduit or line 116, cylinder valve 102 and the conduit 115. By venting the cylinders 48, 50 in this manner, they are free to move to the raised position 38 without the air in the tops 64, 66 of the cylinders 48, 50 restraining the upward movement.

Once the sensors 32, 34 are in their raised position 38, loading of the cargo 18 is accomplished with the operation of the sensors to warn the operator when the cargo is above the predetermined height "d" as described above.

After loading is accomplished and the operator observes that the indicator light 28 and audible signal 30 are not on, he places pins 72 in the support frame members 74 and collars 76 of the trailer 16 and also ties the vehicles 20 down to their respective vehicle carrying platforms 68 so that the vehicles 20 mounted on the trailer do not move. In preparing to begin his journey, the operator turns off the PTO switch 100 and releases the brake switch 114 from the closed position. As seen in FIG. 5, when the PTO switch is turned to the off position, pressurized air is blocked from conduit 106 and the conduit 106 is vented to the atmosphere. When pressurized air is no longer supplied to the PTO unit 82, it is disconnected from the engine 84 and pressurized fluid is no longer supplied to the hydraulic cylinder system 86 or its cylinders 70.

In this condition, when the brake switch 114 is moved to the open position, pressurized air flowing thru the conduit 104 is connected to both the brake valve 81 and the cylinder valve 102. When pressurized air is received by the brake valve 81, the brake system 80 is released and the vehicle is free to move. When pressurized air is received thru the conduit 115 by the cylinder valve 102, the cylinder valve 102 is moved to a lowering position which connects the conduit 116 to the tops 64, 66 of the cylinders 48, 50 and provides pressurized air thereto. In the lowering position the cylinder valve 102 also vents the bottoms 60, 62 of the cylinders 48, 50 to the atmosphere. Accordingly the sensors 32, 34 are moved from a raised position 38 to the lowered position 36.

When the sensors 32, 34 are moved to the lowered position, the key switch 92 is moved to the off position and the sensing circuit 90 is deactivated with the power supply 94 disconnected from the sensors 32, 34 to deactivate the sensors.

Flow control valves 118, 120 are provided in the pneumatic line 116 to control the speed of movement of the cylinders 48, 50 respectively. As the flow control valve is constricted, less air moves thru the line 116 and the cylinder moves at a slower speed. Conversely, when the flow control valve is opened, more air moves thru the valve and the cylinder moves at a greater speed.

The individual flow control valves control the rate at which pressurized air can flow into or from the cylinder and controls the speed of movement of the cylinder. Control valve 120 controls the rate at which pressurized air that can move to or from the top 64 of the cylinder 48, control valve 118 controls the rate at which pressurized air that can move to or from the top 66 of the cylinder 50, control valve 112 controls the rate at which pressurized air that can move to or from the bottom 60 of the cylinder 48, and control valve 110 controls the rate at which pressurized air that can move to or from the bottom 62 of the cylinder 50. The flow control valves can also be used to offset different lengths of the conduits leading to their respective cylinders.

The invention has been described with reference to the preferred embodiments. Obviously, modifications and all ration's will occur to others upon reading this specification. It is my intention to include all modifications and alterations insofar as they, within the scope of the appended claims or equivalents thereof Having described my invention, I claim:

1. A retractable cargo height sensing system mounted on a cargo transporting vehicle for sensing the height above a roadway of cargo on the cargo transporting vehicle including:

an alarm for signaling when the cargo is above a predetermined height above the roadway, a plurality of sensors mounted on the cargo transporting vehicle and movable between a lowered position and a raised position in which said sensors are a predetermined height above the roadway, said sensors positioned on the cargo transporting vehicle when in the raised position to detect when the cargo is above the predetermined height, said sensors providing a signal to said alarm to activate said alarm when the cargo is above the predetermined height above the roadway and said sensors providing a signal to said alarm to deactivate said alarm when the cargo is below the predetermined height of the roadway.

2. A retractable cargo height sensing system as described in claim 1 which includes a switch for selectively connecting and disconnecting electrical power to said sensors.

3. A retractable cargo height sensing system as described in claim 1 in which one of said sensors is mounted on one of the sides of the front of the cargo carrier and another of said sensors is mounted on the other side of the rear of the cargo carrier.

4. A retractable cargo height sensing system as described in claim 1 including a switch for selectively connecting and disconnecting said sensors to a power source.

5. A retractable cargo height sensing system as described in claim 1 which includes motors to move said sensors between the raised and the lowered position.

6. A retractable cargo height sensing system as described in claim 1 in which each of said motors includes a fluid cylinder having opposing ends movable toward and away from each other, each of said sensors attached to one end of one of said fluid cylinders and the other end thereof attached to the cargo carrier for moving said sensors between the lowered and raised positions.

7. A retractable cargo height sensing system as described in claim 5 including a cylinder switching system for selectively connecting pressurized fluid to said motors to move said sensors between the lowered and the raised position.

8. A retractable cargo height sensing system as described in claim 5 in which the cargo carrier vehicle has a power take off system for generating pressurized fluid to move the cargo, which power take off is activated by a power take off switch, said cylinder switching system includes a switch which connects said motors to a pressurized fluid power source to move said sensors from said lowered position to the raised position when the power take off of the cargo carrier vehicle is activated.

9. A retractable cargo height sensing system as described in claim 8 in which in said cylinder switching system includes a switch which connects said motors to a pressurize fluid power source when the brakes of the cargo carrying vehicle are released the two move the sensors from the raised position to the lowered position.

10. A retractable cargo height sensing system as described in claim 1 which includes flow control valves for controlling the rate of movement of said sensors between said raised in said lowered position.

11. A method for sensing the distance above a roadway of cargo on a cargo transporting vehicle the including the steps of:

activating a plurality of sensors mounted on the cargo transporting vehicle a predetermined height above the roadway, loading cargo on the cargo transporting vehicle, activating an alarm with a signal from the sensors when the cargo is above a predetermined height above the roadway, moving the cargo on the cargo transporting vehicle until it is below the predetermined height above the roadway, and deactivating the alarm with a signal from the sensors when the cargo is below the predetermined height above the roadway.

12. A method for sensing the distance above a roadway of cargo on a cargo transporting vehicle as described in claim 11 which includes the steps of:

raising the plurality of sensors from a lowered position to a raised position a predetermined height above the roadway before the step of activating the sensors, and lowering the plurality of sensors from the raised position to a lowered position after the step of moving the cargo on the cargo transporting vehicle until it is below the predetermined height above the roadway.

13. A method for sensing the distance above a roadway of cargo on a cargo transporting vehicle as described in claim 12 in which the step of raising the plurality of sensors includes the steps of engaging the braking system on the cargo transporting vehicle and engaging the power take off unit of the cargo transporting vehicle.

14. A method for sensing the distance above a roadway of cargo on a cargo transporting vehicle as described in claim 12 in which the step of lowering the plurality of sensors includes the steps of disengaging the braking system of the cargo transporting vehicle and disengaging the power take off unit of the cargo transporting vehicle.

* * * * *